United States Patent
Seido et al.

(10) Patent No.: US 7,399,532 B2
(45) Date of Patent: Jul. 15, 2008

(54) CORROSIVE RESISTANT METAL MATERIAL COVERED WITH CONDUCTIVE SUBSTANCE

(75) Inventors: Masahiro Seido, Tokyo (JP); Tatsuya Tonogi, Tokyo (JP); Kazuhiko Nakagawa, Tokyo (JP); Minoru Shirahige, Chiba (JP); Masahiro Okahara, Chiba (JP)

(73) Assignees: Hitachi Cable, Ltd., Tokyo (JP); Hitachi Powdered Metals Co., Ltd., Matsudo-shi (JP)

( * ) Notice: Subject to any disclaimer, the term of this patent is extended or adjusted under 35 U.S.C. 154(b) by 781 days.

(21) Appl. No.: 10/388,216

(22) Filed: Mar. 14, 2003

(65) Prior Publication Data
US 2003/0235711 A1  Dec. 25, 2003

(30) Foreign Application Priority Data
Mar. 19, 2002  (JP)  ............................. 2002-075562

(51) Int. Cl.
*B32B 15/04* (2006.01)
*B32B 15/08* (2006.01)
*B32B 15/18* (2006.01)
*B32B 15/20* (2006.01)

(52) U.S. Cl. ..................... 428/626; 428/660; 428/662; 428/457; 428/681; 428/634; 428/688

(58) Field of Classification Search ................ 428/615, 428/626, 610, 627, 457, 681, 634, 220, 218, 428/332, 339, 458, 459, 460, 461, 465, 466, 428/467, 408, 402, 469, 470, 471, 472, 688, 428/699, 468, 328, 323, 403, 407, 660, 662
See application file for complete search history.

(56) References Cited

U.S. PATENT DOCUMENTS

| | | | | |
|---|---|---|---|---|
| 5,968,682 | A | * 10/1999 | Moriyama et al. | ........... 429/176 |
| 6,287,644 | B1 | * 9/2001 | Jackson et al. | .............. 427/566 |
| 6,306,524 | B1 | * 10/2001 | Spitsberg et al. | ............ 428/621 |
| 6,344,282 | B1 | * 2/2002 | Darolia et al. | .............. 428/652 |
| 2002/0009611 | A1 | * 1/2002 | Darolia et al. | .............. 428/680 |
| 2003/0064241 | A1 | * 4/2003 | Suzuki et al. | ............... 428/626 |
| 2004/0110058 | A1 | * 6/2004 | Lee et al. | ....................... 429/40 |

FOREIGN PATENT DOCUMENTS

| | | | |
|---|---|---|---|
| GB | 2344355 | * | 6/2000 |
| JP | 04-054491 | * | 2/1992 |
| JP | 2000-138067 | * | 5/2000 |
| JP | 2000-138067 A | | 5/2000 |
| WO | WO 01/48265 | * | 7/2001 |

* cited by examiner

Primary Examiner—Michael La Villa
(74) Attorney, Agent, or Firm—Foley & Lardner LLP

(57) ABSTRACT

A corrosive resistant metal material covered with a conductive substance suitable for use in a component material requiring conductivity and corrosion resistance like electrical conductive material, electrical contact, electromagnetic wave shield, electrochemical electrode or antistatic material, specifically for component material requiring conductivity in sever condition of corrosive environment is provided. A corrosive resistant metal material covered with a conductive substance is formed by cladding a corrosive resistant metal selected from the group consisting of titanium, zirconium, tantalum, niobium and alloy thereof on a conductive metal selected from the group consisting of iron, aluminum, copper, titanium, magnesium, zirconium, tantalum, niobium, tungsten, nickel, chrome and alloy thereof, and covering a conductive surface finishing layer over surface of a corrosive resistant metal layer with a mixture of conductive substance and resinous binder.

24 Claims, 1 Drawing Sheet

CORROSIVE RESISTANT METAL MATERIAL COVERED WITH CONDUCTIVE SUBSTANCE

BACKGROUND OF THE INVENTION

1. Field of the Invention

Figure 1:
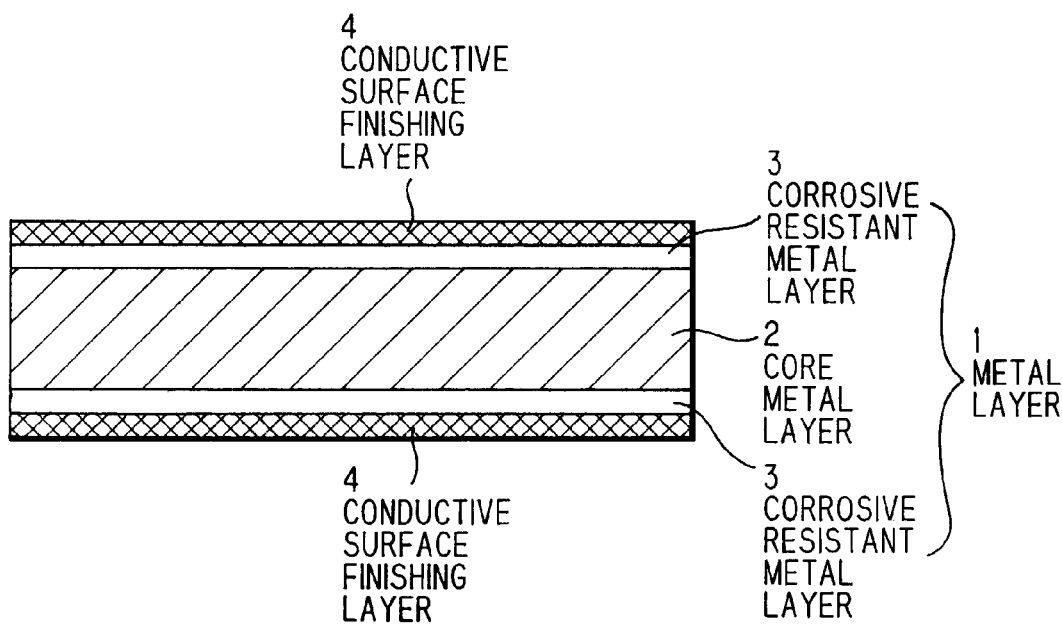

The present invention relates to a corrosive resistant metal material covered with a conductive substance that is suitable for use in a component material requiring conductivity and corrosion resistance like electrical conductive material, electrical contact, electromagnetic wave shield, electrochemical electrode or antistatic material, more specifically, to a composite corrosive resistant metal material covered with a conductive substance that having both properties of each component substance, being usable for clad raw material for use in secondary working by its good surface lubricity and good releasability in processing, and being expected for application to a base material of various equipments.

2. Prior Art

In electrical equipments, many of them are used in environments exposed to atmosphere, fresh water or salty water. Contact material or conductive material used for power transmitting or signal transmitting in these equipments may be corroded in such environments, consequently, reliability of equipments may be impaired or life of equipments may be expired.

In an area of industry utilizing electrochemistry, metal is used abundantly for electrode of electroplating, molten salt electrolysis, desalination equipment or brine electrolysis, from the viewpoint of cost, stainless steel or nickel based alloy is used as electrode or insoluble electrode to prevent generation of lysate from electrode.

Metal exhibits excellent feature as a structural material, but iron based metal may not satisfy corrosion resistance. To solve this problem, metal material covered with polymer paint, polymer lining or polymer film may be used. However, according to environment or equipment to be used, covered polymer may be charged and may affect a bad influence such as damage to environment equipment by discharging.

Also in an electromagnetic wave shield, in order to give priority to electromagnetic shield characteristic, corrosion resistance of substrate metal may be sacrificed. In a fuel cell, metal is used for a separator or etc. of solid electrolyte type fuel cell, phosphoric type fuel cell, molten carbonate type fuel cell, solid polymer type fuel cell or methanol fuel cell. If a separator of a fuel cell is formed by metal, conductivity may be decreased by growth of passive state film of metal surface due to electrolysis phenomenon, in some cases corrosion may be caused.

To prevent these problems, covering layer having conductivity and corrosion resistant is generally formed over metal.

Conventionally, SUS (stainless steel), Ti (titanium) and Ti cladding material are known as corrosion resistant and conductive substrate, but these are not sufficient in conductivity. In case of SUS, contact resistance is increased by passive state film formed over surface, and in case of Ti, contact resistance is increased by large resistivity $TiO_2$ (titanium oxide) formed over surface. As means for increasing conductivity, after secondary working, forming of conductive and corrosion resistant covering layer such as TiN (titanium nitride), TiC (titanium carbide) or Au (gold) is known, but there are problems that the processing causes high cost and is complicated.

Further, excellent corrosion resistant metal such as SUS or Ti is poor in lubricity at secondary working, therefore, there is problem that large deformation cannot be given by burning to mold at press working. To solve this problem, lubricant is used generally at press working, but man-hour is required for coating and removing of lubricant, moreover residual of lubricant has an adverse effect to performance.

SUMMARY OF THE INVENTION

An object of the present invention is to provide an corrosive resistant metal material covered with a conductive substance for use in a component material which is a composite component material having excellent corrosion resistant and conductivity, and usable for secondary working material provided with excellent surface lubricity and mold releasability at processing.

In accordance with this invention, there is provided a corrosive resistant metal material covered with a conductive substance, comprising, a metal layer having a core metal layer formed by a conductive metal and corrosive resistant metal layer formed on said core metal layer, and a conductive surface finishing layer formed on surface of said corrosive resistant metal layer.

In the present invention, the corrosive resistant metal layer may be formed on one side of the core metal layer or both sides of the core metal layer. Further, the corrosive resistant metal layer may be formed surrounding the periphery of the core metal layer.

In the present invention, the core metal layer serves mainly to ensure electric conductivity and mechanical strength of the corrosive resistant metal material covered with a conductive substance.

It is preferable that the conductive metal which forms the core metal layer is selected from the group consisting of iron, aluminum, copper, titanium, magnesium, zirconium, tantalum, niobium, tungsten, nickel, chrome and alloy thereof. In these metals, it is preferable to use iron, copper, aluminum or magnesium for the cost reduction, and in addition, aluminum or magnesium is preferable for lightening, copper is preferable for high conductivity, and iron is preferable for strengthening.

Further, in the present invention, the corrosive resistance of the corrosive resistant metal material covered with a conductive substance is exhibited by corrosive resistance originally owned by the corrosive resistant metal layer. Over the surface of the corrosive resistant metal layer, oxide of semiconductive material generated in nanometer order forms a stable film (oxide film) which has absolute corrosive resistant effect. However, if the thickness of this oxide film is too large, the surface electric resistivity of the corrosive resistant metal material covered with a conductive substance increases, it is preferable to make the oxide film as thin as possible by polishing before the conductive surface finishing layer is formed.

It is preferable that the corrosive resistant metal which forms the corrosive resistant metal layer is selected from the group consisting of titanium, zirconium, tantalum, niobium and alloy thereof.

A large bonding strength between the interface of the core metal layer and the corrosive resistant metal layer is achieved by forming an intermetallic compound in the interface of the core metal layer and the corrosive resistant metal layer. Such intermetallic compound is formed, for example, by passing the core metal layer and the corrosive resistant metal layer between a pair of pressure rolls (hereinafter called "cladding"), by plating the core metal layer with the corrosive resistant metal layer, or by spraying the corrosive resistant metal layer to the core metal layer, and these processes are preferably carried out without oxidized layer and fouling in the interface between the core metal layer and the corrosive resistant metal layer.

In case of cladding, in order to realize stabilized bonding, hardness ratio of the metal of the corrosive resistant metal layer to the metal of the core metal layer to be preferably ⅓ to 3, and the thickness of the corrosive resistant metal layer to be preferably over 10 μm. In this respect, if the thickness of the corrosive resistant metal layer increases, the cost of the product increases, the thickness of the corrosive resistant metal layer (including both layers) preferably to be less than 30% of the overall thickness of the metal layer. By cladding under above condition, the intermetallic compound of thickness from submicron to micron order is formed.

When the titanium or titanium alloy is used to form the corrosive resistant metal layer by cladding over the core metal layer, it is preferable that the hydrogen content is less than 0.05 ppm so that titanium or titanium alloy show stable characteristic as a corrosive resistant metal by preventing hydrogen embrittlement in processing. More preferably, impurity concentration of titanium or titanium alloy is less than 0.05 ppm of hydrogen, less than 0.2 ppm of oxygen, less than 0.25 ppm of iron and less than 0.05 ppm of nitrogen.

Further more, in the present invention, the conductive surface finishing layer is formed to prevent the oxidation of the corrosive resistant metal material. By providing the conductive surface finishing layer, it becomes possible to prevent further generation of the oxide film and to retain the thickness of the oxide film under nanometer order. Consequently, the corrosive resistant metal material covered with a conductive substance having excellent conductivity can be obtained.

The corrosive resistant metal material covered with a conductive substance of the present invention provides a composite constructive substrate having good corrosive resistance and conductivity, and is used for secondary working material having excellent surface lubricity and mold releasability at processing.

It is preferable that the conductive surface finishing layer is formed by conductive substance selected from the group consisting of carbon, conductive ceramics and metal powder. More preferably, the conductive surface finishing layer is formed by the mixture of a conductive substance and a resinous binder.

It is preferable that the carbon is selected from the group consisting of natural graphite, artificial graphite, carbon black, carbon nanotube, carbon nanofiber, fullerene and carbon fiber, the conductive ceramics is selected from the group consisting of metal silicide, metal carbide, metal nitride and metal boride, and the metal powder is selected from the group consisting of silver, nickel, aluminum, titanium, tantalum, tungsten, gold, platinum, rhodium and palladium.

It is preferable that the resinous binder contains at least one selected from the group consisting of fluorinated resin, silicone resin, phenolic resin, epoxy resin, polyimide resin, polyamide resin, polyolefin resin, furan resin and rubber. More preferably, the resinous binder is comprising polyvinylidene fluoride (PVdF) or copolymer of polyvinylidene fluoride and hexafluoropropylene (HFP). The HFP content in the copolymer of PVdF and HFP (PVdF-HFP copolymer) is preferably 0.1-30 volume %. By using the PVdF-HFP copolymer as the resinous binder, adhesiveness of the conductive surface finishing layer to the corrosion resistant metal layer is increased. If the HFP content of the PVdF-HFP copolymer exceeds 30 volume %, heat resistance lowers by decrease of crystal content.

The compounding ratio of the conductive substance and the resinous binder is preferably 10:90-90:10 by volume ratio. If the conductive substance content falls below 10%, conductivity lowers, and if exceeds 90%, adhesiveness of the conductive surface finishing layer to the corrosion resistant metal layer is decreased.

In order to achieve good release property, it is preferable to form the conductive surface finishing layer by the mixture of the conductive substance and resinous binder, and in order to achieve good surface lubricity, it is preferable to use graphite or mixture of graphite and carbon black as the conductive substance. By this, secondary working can be carried out without using lubricant.

Further, the compounding ratio of the graphite and the carbon black is preferably 25:75-90:10 by volume ratio. The graphite shows good lubricity and conductivity, but it shows anisotropy in conductivity. Vertical volume resistivity of the graphite is $10^{-1}$ Ω·cm, while lateral volume resistivity is $10^{-4}$ Ω·cm, therefore, there is 1000 times difference. The graphite particle is apt to yield orientation in the conductive surface finishing layer, in order to increase conductivity to vertical direction (thickness direction), it is preferable to densify the conductive surface finishing layer to make conductive network between the graphite particles. The densifying is preferably done before or during second working by, for example, rolling, pressing, forging or drawing. Further, by mixing the carbon black in the graphite, the conductivity is improved because clearances between the graphite particles are filled with the carbon black and electrical contacts increase. Moreover, by the mixing the carbon black, strength and adhesiveness of the conductive surface finishing layer are tend to increase. The compounding ratio of the graphite and the carbon black is preferably 25:75-90:10 by volume ratio by considering denseness, conductivity and corrosive resistance.

The thickness of the conductive surface finishing layer is not specifically limited, but preferably to be 3-100 μm. If the thickness is less than 3 μm, oxidation reaction of the surface of the corrosive resistant metal layer may progresse through the conductive surface finishing layer, conductivity may be lowered. For the purpose of preventing oxidation, thickness over 100 μm is not required, rather, if the thickness exceeds 100 μm, nonuniformity such as crack is easy to occur.

BRIEF DESCRIPTIION OF THE DRAWINGS

Figure 2:
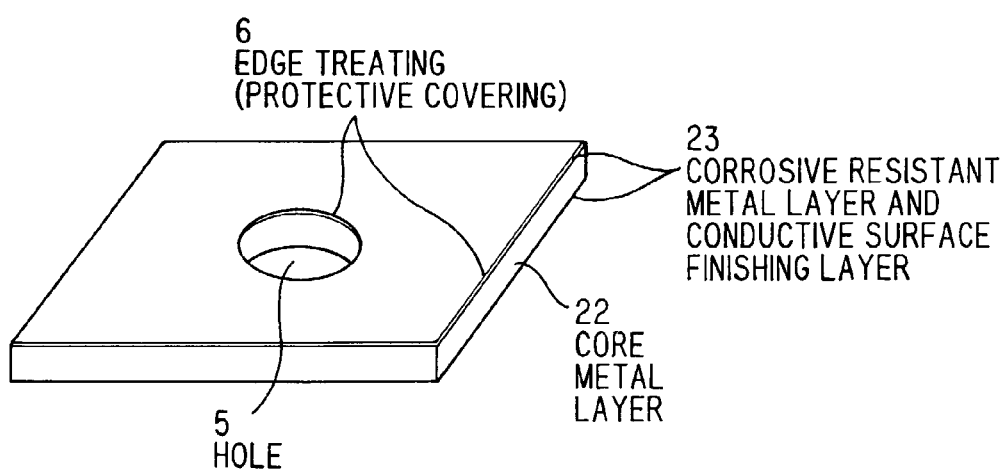

The invention will be explained in more detail in conjunction with the appended drawings, wherein:

FIG. 1 is a cross sectional view showing a corrosive resistant metal material covered with conductive substance in accordance with an embodiment of the present invention; and FIG. 2 is a perspective view showing a punched corrosive resistant metal material covered with conductive substance in accordance with an embodiment of the present invention.

DESCRIPTION OF THE PREFERRED EMBODIMENTS

Preferred embodiments of the present invention will be explained in conjunction with accompanying drawings.

FIG. 1 is a cross sectional view showing a corrosive resistant metal material covered with conductive substance in accordance with the embodiment of the present invention.

A plate of corrosive resistant metal material covered with conductive substance shown in FIG. 1, comprising, a metal layer 1 having a core metal layer 2 formed by a good conductive metal and a corrosive resistant metal layer 3 formed on the core metal layer 2 by a corrosive resistant metal, and a conductive surface finishing layer 4 formed on the surface of the corrosive resistant metal layer 3 by a conductive substance. On both sides of the metal layer 1 the corrosive resistant metal layers 3, 3 are formed, and over the surface of each corrosive resistant metal layer 3, the conductive surface finishing layer 4 is formed respectively.

Samples 1-8

Three kinds of metals of copper, aluminum and iron are used to form the core metal layer 2, titanium is used to form the corrosive resistant metal layers 3 and conductive substance containing graphite, carbon black and resinous binder is used to form the conductive surface finishing layer 4.

Width of the metal layer 1 is 100 μm, and thickness of it is 0.3 μm. Thickness of the corrosive resistant metal layer 3 is 20-30 μm, and thickness of the conductive surface finishing layer 4 is 20 μm. The corrosive resistant metal layers 3, 3 are formed by cladding over the core metal layer 2. After removing the oxide film formed over the corrosive resistant metal layer 3, the conductive surface finishing layer 4 is formed over the corrosive resistant metal layers 3. In samples 1, 3 and 5, the conductive surface finishing layer 4 are not formed, and in samples 7 and 8, both the corrosive resistant metal layers 3 and the conductive surface finishing layer 4 are not formed.

Constitution and characteristics of samples 1-8 are shown in TABLE 1. Samples 2, 4 and 6 are examples within the scope of the present invention, and Samples 1, 3, 5, 7 and 8 are comparative examples outside of the present invention.

Measurement of the resistivity of thickness direction and observation of the metal surface oxidizing discoloration were carried out after PCT (Pressure Cooker Test. at 120° C., 2 atm, in steam). The resistivity of thickness direction was measured by four terminal method, holding the sample with soft metal. The corrosion resistance was evaluated by the measurement result of polarization characteristic in sulfuric acid in conformity with JISG0591. The conductive corrosion resistance is total evaluation judged from the resistivity of thickness, the metal surface oxidizing discoloration and the corrosion resistance.

As shown in TABLE 1, in sample 7 of which the metal layer 1 was consisting of copper, resistivity of thickness direction was good, but inferior in corrosion resistance. In sample 8 of which the metal layer was consisting of SUS, inferior in both resistivity of thickness direction and corrosion resistance. In case of sample 8, it was supposed that resistivity of thickness direction was affected by passive state film formed on surface of SUS.

In samples 1, 3 and 5 of which the conductive surface finishing layer 4 was not formed over the corrosive resistant metal layer 3, before PCT test, resistivity of thickness direction was almost same as samples 2, 4 and 6 of which the conductive surface finishing layer 4 was formed, but after PCT test, resistivity of thickness direction increased greatly. In addition, in samples 1, 3 and 5, after PTC test, even though the surface of the corrosive resistant metal layer 3 was oxidized (color of titanium surface changed to violet), but the layer was not corroded.

In samples 2, 4 and 6 of which the conductive surface finishing layer 4 was formed over the corrosive resistant metal layer 3, after PCT test, resistivity of thickness direction was not increased and surface of the corrosive resistant metal layer 3 was not oxidized.

Samples 9-13

In samples 9-13, conductive ceramics and metal powder were used as the conductive material of the conductive sur-

TABLE 1

| Sample No. | 1 | 2 | 3 | 4 | 5 | 6 | 7 | 8 |
|---|---|---|---|---|---|---|---|---|
| Metal layer constitution | Ti/Cu/Ti | | Ti/Al/Ti | | Ti/Fe/Ti | | Cu | SUS |
| Metal layer thickness (mm) | 0.3 | | 0.3 | | 0.3 | | 0.5 | 0.5 |
| Titanium layer thickness (μm) | 30 | | 30 | | 20 | | — | — |
| Surface finishing layer thickness (μm) | 0 | 20 | 0 | 20 | 0 | 20 | — | — |
| Surface finishing layer conductive material (Graphite/Carbon black) | | 75/25 | | | | | — | — |
| Surface finishing layer binder | | PVdF - 10 % HFP Copolymer | | | | | — | — |
| Surface finishing layer composition (Conductive material/Binder) | | 50/50 | | | | | — | — |
| Resistivity of thickness direction (mΩ · cm$^2$) | x 20 | ○ 2.1 | x 30 | ○ 2.8 | x 25 | ○ 3.2 | ○ 3 | x 25 |
| Metal surface oxidizing discoloration | arisen | none | arisen | none | arisen | none | arisen | arisen |
| Corrosion resistance (Polarization characteristic) | ○ | ○ | ○ | ○ | ○ | ○ | x | Δ |
| Conductive corrosion resistance | Δ | ○ | Δ | ○ | Δ | ○ | x | x | face finishing layer 4 instead of mixture of graphite and carbon black. Constitution and characteristics of samples 9-13 are shown in TABLE 2.

TABLE 2

| Sample No. | 9 | 10 | 11 | 12 | 13 |
|---|---|---|---|---|---|
| Metal layer constitution | Ti/Cu/Ti | | | | |
| Metal layer thickness (mm) | 0.3 | | | | |
| Titanium layer thickness (μm) | 30 | | | | |
| Surface finishing layer thickness (μm) | 20 | 10 | 10 | 10 | 3 |
| Surface finishing layer conductive material — Conductive ceramics | WC | TiN | — | — | — |
| Surface finishing layer conductive material — Metal powder | — | — | Ag | Ni | Pt |
| Surface finishing layer binder | PVdF - 10% HFP Copolymer | | | | |
| Surface finishing layer composition (Conductive material/Binder) | 50/50 | | | | |
| Resistivity of thickness direction (mΩ · cm²) | ○ 0.26 | ○ 5.9 | ○ 0.2 | ○ 0.15 | ○ 0.1 |
| Metal surface oxidizing discoloration | none | none | none | none | none |
| Corrosion resistance (Polarization characteristic) | ○ | ○ | ○ | ○ | ○ |
| Conductive corrosion resistance | ○ | ○ | ○ | ○ | ○ |

As shown in TABLE 2, samples 9-13 showed excellent characteristics in resistivity of thickness direction and corrosion resistance.

Samples 14-19

In samples 14-19, the conductive surface finishing layer 4 formed by using conductive material containing graphite was densified to make conductive network between the graphite particles. The densifying of the conductive surface finishing layer 4 was carried out by rolling, press, forging or drawing after forming of the conductive surface finishing layer 4 during manufacturing process of the corrosive resistant metal material covered with conductive substance. The densifying may be carried out during secondary working of the corrosive resistant metal material covered with conductive substance. Constitution and characteristics of samples 14-19 are shown in TABLE 3.

TABLE 3

| Sample No. | 14 | 15 | 16 | 17 | 18 | 19 |
|---|---|---|---|---|---|---|
| Metal layer constitution | Ti/Cu/Ti | | Ti/Al/Ti | | Ti/Fe/Ti | |
| Metal layer thickness (mm) | 0.3 | | 0.3 | | 0.3 | |
| Titanium layer thickness (μm) | 30 | | 30 | | 30 | |
| Surface finishing layer thickness (μm) | 20 | | 20 | | 20 | |
| Surface finishing layer conductive material (Graphite/Carbon black) | 75/25 | | | | | |
| Surface finishing layer binder | PVdF - 10% HFP Copolymer | | | | | |
| Surface finishing layer composition (Conductive material/Binder) | 50/50 | | | | | |
| Densifying method | (A) | (B) | (A) | (B) | (A) | (B) |
| Resistivity of thickness direction (mΩ · cm²) | ○ 0.6 | ○ 0.6 | ○ 0.8 | ○ 0.8 | ○ 0.9 | ○ 0.9 |
| Metal surface oxidizing discoloration | none | none | none | none | none | none |
| Corrosion resistance (Polarization characteristic) | ○ | ○ | ○ | ○ | ○ | ○ |
| Conductive corrosion resistance | ○ | ○ | ○ | ○ | ○ | ○ |

Notes: (A) Densifing was carried out by rolling during manufacturing process of the corrosive resistant metal material covered with conductive substance. (B) Densifing was carried out by press during secondary working of the corrosive resistant metal material covered with conductive substance As shown in TABLE 3, samples 14-19 showed excellent characteristics in resistivity of thickness direction and corrosion resistance, especially in resistivity of thickness direction.

Samples 20-25

In samples 20-25, silicone resin, epoxy resin, PVdF-5% HFP copolymer, PVdF-30% HFP copolymer, PVdF-35% HFP copolymer and PVdF were used as the binder of the conductive surface finishing layer 4. Constitution and characteristics of samples 20-25 are shown in TABLE 4.

TABLE 4

| Sample No. | 20 | 21 | 22 |
|---|---|---|---|
| Metal layer constitution | Ti/Cu/Ti | | |
| Metal layer thickness (mm) | 0.3 | | |
| Titanium layer thickness (μm) | 30 | | |
| Surface finishing layer thickness (μm) | 20 | | |
| Surface finishing layer conductive material (Graphite/Carbon black) | 75/25 | | |
| Surface finishing layer binder | silicone resin | epoxy resin | PVdF |
| Surface finishing layer composition (Conductive material/Binder) | 50/50 | | |
| Resistivity of thickness direction (mΩ · cm²) | ○ 2.1 | ○ 1.9 | ○ 1.9 |
| Metal surface oxidizing discoloration | none | none | none |
| Corrosion resistance (Polarization characteristic) | ○ | ○ | Δ |
| Conductive corrosion resistance | ○ | ○ | Δ |

| Sample No. | 23 | 24 | 25 |
|---|---|---|---|
| Metal layer constitution | Ti/Cu/Ti | | |
| Metal layer thickness (mm) | 0.3 | | |
| Titanium layer thickness (μm) | 30 | | |
| Surface finishing layer thickness (μm) | 20 | | |
| Surface finishing layer conductive material (Graphite/Carbon black) | 75/25 | | |
| Surface finishing layer binder | PVdF - 5% HFP Copolymer | PVdF - 30% HFP Copolymer | PVdF - 35% HFP Copolymer |
| Surface finishing layer composition (Conductive material/Binder) | 50/50 | | |

TABLE 4-continued

| | | | |
|---|---|---|---|
| Resistivity of thickness direction (mΩ·cm²) | ○ 1.9 | ○ 2.1 | ○ 2.2 |
| Metal surface oxidizing discoloration | none | none | none |
| Corrosion resistance (Polarization characteristic) | ○ | ○ | Δ |
| Conductive corrosion resistance | ○ | ○ | Δ |

As shown in TABLE 4, samples 20-25 showed excellent characteristics in resistivity of thickness direction and corrosion resistance.

Samples 26-29

In samples 26-29, compounding ratio of the conductive substance and the resinous binder is selected to be 10:90 and 90:10, and compounding ratio of the graphite and the carbon black is selected to be 25:75 and 90:10. Constitution and characteristics of samples 26-29 are shown in TABLE 5.

TABLE 5

| Sample No. | 26 | 27 | 28 | 29 |
|---|---|---|---|---|
| Metal layer constitution | Ti/Cu/Ti | | | |
| Metal layer thickness (mm) | 0.3 | | | |
| Titanium layer thickness (μm) | 30 | | | |
| Surface finishing layer thickness (μm) | 20 | | | |
| Surface finishing layer conductive material (Graphite/Carbon black) | 75/25 | | 25/75 | 90/10 |
| Surface finishing layer binder | PVdF - 15% HFP Copolymer | | | |
| Surface finishing layer composition (Conductive material/Binder) | 10/90 | 90/10 | 50/50 | |
| Resistivity of thickness direction (mΩ·cm²) | Δ 14 | ○ 1.0 | ○ 10 | ○ 9 |
| Metal surface oxidizing discoloration | none | none | none | none |
| Corrosion resistance (Polarization characteristic) | ○ | ○ | ○ | ○ |
| Conductive corrosion resistance | Δ | ○ | ○ | ○ |

As shown in TABLE 5, samples 26-29 showed excellent characteristics in resistivity of thickness direction and corrosion resistance.

FIG. 2 is a perspective view showing a punched corrosive resistant metal material covered with conductive substance in accordance with an embodiment of the present invention. This punched corrosive resistant metal material covered with conductive substance is formed by punching the corrosive resistant metal material covered with conductive substance shown in FIG. 1, and treating the exposed edge portion of the core metal layer with protective covering. In FIG. 2, numeral 22 denotes the core metal layer, numeral 23 denotes the layer comprising the corrosive resistant metal layer and the conductive surface finishing layer, numeral 5 denotes the hole formed by the punching, and numeral 6 denotes the edge treating (protective covering) formed to protect the exposed portion of the core metal layer 22.

Samples 30-33

In samples 30 and 31, the corrosive resistant metal material covered with a conductive substance was formed by cladding titanium on both sides of copper, and covering the conductive surface finishing layer on the surface of the titanium layer. In samples 32 and 33, aluminum alloy was used instead of copper. In sample 30, neoprene rubber was covered over the exposed portion of the core metal layer 22, and in sample 32, alumite treating was made to the exposed portion of the core metal layer 22. In samples 31 and 33, the edge treating was not formed. Constitution and characteristics of samples 30-33 are shown in TABLE 6.

TABLE 6

| Sample No. | 30 | 31 | 32 | 33 |
|---|---|---|---|---|
| Metal layer constitution | Ti/Cu/Ti | | Ti/Al alloy/Ti | |
| Metal layer thickness (mm) | 0.3 | | | |
| Titanium layer thickness (μm) | 30 | | | |
| Surface finishing layer thickness (μm) | 20 | | | |
| Surface finishing layer conductive material (Graphite/Carbon black) | 80/20 | | | |
| Surface finishing layer binder | PVdF - 10% HFP Copolymer | | | |
| Surface finishing layer composition (Conductive material/Binder) | 50/50 | | | |
| Edge treating | neoprene | none | alumite | none |
| Resistivity of thickness direction (mΩ·cm²) | ○ 1.5 | ○ 2.0 | ○ 1.8 | ○ 2.1 |
| Metal surface oxidizing discoloration | none | none | none | none |
| Corrosion resistance (Polarization characteristic) | ○ | x | ○ | x |
| Conductive corrosion resistance | ○ | x | ○ | x |

As shown in TABLE 6, samples 30 and 32 of which edge treatment was formed showed excellent characteristics in resistivity of thickness direction and corrosion resistance, but samples 31 and 33 of which edge treatment was not formed showed generation of corrosion to the core metal, consequently there is problem in corrosion resistance.

As described above in detail, a corrosive resistant metal material covered with a conductive substance of the present invention is suitable for use in a component material requiring conductivity and corrosion resistance like electrical conductive material, electrical contact, electromagnetic wave shield, electrochemical electrode or antistatic material, specifically for component material requiring conductivity in sever condition of corrosive environment.

Further, a corrosive resistant metal material covered with a conductive substance of the present invention can be used in particularly sever corrosive environment, consequently application to a separator material of a fuel cell is one of optimum field. Specifically, applicable to a separator or etc. of solid electrolyte type fuel cell, phosphoric type fuel cell, molten carbonate type fuel cell, solid polymer type fuel cell or methanol fuel cell.

Further more, a corrosive resistant metal material covered with a conductive substance of the present invention exhibits both properties of each component material in a form of composite component material, and moreover can be used for raw material for use in secondary working by its good surface lubricity and good releasability in processing, it is expected for application to a base material of various equipments.

Further more, when graphite is used as conductive material of a conductive surface finishing layer, raw material having excellent secondworkability can be provided, therefore, efficiency of secondary working is improved greatly. Generally, oil-based lubricant is used in secondary working, however, a corrosive resistant metal material covered with a conductive substance of the present invention is provided with lubricity to itself, lubricant is not required in secondary working, therefore, coating and removing of lubricant become unnecessary. This contributes to improvement of workability and makes working environment clean. In terms of quality, a corrosive resistant metal material covered with a conductive substance of the present invention exhibits excellent adhesiveness and uniform and good characteristics of a conductive surface finishing layer comparing with a product made by covering conductive surface finishing layer after secondary working. Still more, a conductive surface finishing layer containing graphite is dencified by secondary working and its corrosive resistance can be improved, a corrosive resistant metal material covered with a conductive substance of the present invention is inherently provided with excellent quality comparing with a product made by covering conductive surface finishing layer after secondary working. Even though cost of a corrosive resistant metal material covered with a conductive substance of the present invention rises a little, but by improving workability of secondary working, low cost product can be provided totally.

Since a metal layer is comprised of a core metal layer formed by a good conductive metal and a corrosive resistant metal layer formed by a corrosive resistant metal, a raw material for use in secondary working provided with conductivity, corrosive resistance and various characteristics can be obtained by selecting a core metal layer. For example, light material can be obtained by using aluminum or magnesium, electrical conductivity and heat conductivity material can be obtained by using copper, and strengthened material can be obtained by using iron.

Although the invention has been described with respect to specific embodiment and clear disclosure, the appended claims are not to be thus limited but are to be construed as embodying all modification and alternative constructions that may be occurred to one skilled in the art which fairly fall within the basic teaching herein set forth.

What is claimed is:

1. A corrosive resistant metal material covered with a conductive substance, comprising:
    a metal layer comprising a core metal layer comprising a conductive metal and a corrosive resistant metal layer formed on said core metal layer;
    a conductive oxidation-preventing layer formed on a surface of said corrosive resistant metal layer and comprising a mixture of conductive substance and resinous binder; and
    an intermetallic compound formed at an interface of said core metal layer and said corrosive resistant metal layer,
    wherein said corrosive resistant metal layer comprises a corrosive resistant metal, wherein the corrosive resistant metal is selected from the group consisting of titanium, zirconium, tantalum, niobium, a titanium alloy, a zirconium alloy, a tantalum alloy, and a niobium alloy.

2. A corrosive resistant metal material covered with a conductive substance according to claim 1, wherein:
    said core metal layer comprises at least one of iron, aluminum, copper, titanium, magnesium, zirconium, tantalum, niobium, tungsten, nickel, chrome, an iron alloy, an aluminum alloy, a copper alloy, a titanium alloy, a magnesium alloy, a zirconium alloy, a tantalum alloy, a niobium alloy, a tungsten alloy, a nickel alloy, and a chrome alloy.

3. A corrosive resistant metal material covered with a conductive substance according to claim 1, wherein:
    a compounding ratio of said conductive substance and said resinous binder is 10:90-90:10 by volume ratio.

4. A corrosive resistant metal material covered with a conductive substance according to claim 1, wherein:
    said metal layer comprises a core metal layer and corrosive resistant metal layers formed on both sides of said core metal layer.

5. A corrosive resistant metal material covered with a conductive substance according to claim 1, wherein:
    said intermetallic compound is formed by passing said core metal layer and said corrosive resistant metal layer between a pair of pressure rolls.

6. A corrosive resistant metal material covered with a conductive substance according to claim 1, wherein:
    a hardness ratio of said corrosive resistant metal layer to said core metal layer is $1/3$ to 3.

7. A corrosive resistant metal material covered with a conductive substance according to claim 1, wherein:
    a thickness of said corrosive resistant metal layer is more than 10 μm and less than 30% of the overall thickness of said metal layer.

8. A corrosive resistant metal material covered with a conductive substance according to claim 1, wherein:
    said conductive substance is selected from the group consisting of carbon, conductive ceramics and metal powder.

9. A corrosive resistant metal material covered with a conductive substance according to claim 8, wherein:
    said carbon comprises at least one of natural graphite, artificial graphite, carbon black, carbon nanotube, carbon nanofiber, fullerene and carbon fiber.

10. A corrosive resistant metal material covered with a conductive substance according to claim 8, wherein:
    said conductive ceramics comprises at least one of metal silicide, metal carbide, metal nitride and metal boride.

11. A corrosive resistant metal material covered with a conductive substance according to claim 8, wherein:
    said metal powder comprises at least one of silver, nickel, aluminum, titanium, tantalum, tungsten, gold, platinum, rhodium and palladium.

12. A corrosive resistant metal material covered with a conductive substance according to claim 1, wherein:
    said conductive substance is graphite or a mixture of graphite and carbon black.

13. A corrosive resistant metal material covered with a conductive substance according to claim 12, wherein:
    said conductive oxidation-preventing layer is densified to make a conductive network between graphite particles.

14. A corrosive resistant metal material covered with a conductive substance according to claim 13, wherein:
    said conductive oxidation-preventing layer is densified by rolling, pressing, forging or drawing.

15. A corrosive resistant metal material covered with a conductive substance according to claim 1, wherein:
    said resinous binder comprises at least one of fluorinated resin, silicone resin, phenolic resin, epoxy resin, polyimide resin, polyamide resin, polyolefin resin, furan resin and rubber.

16. A corrosive resistant metal material covered with a conductive substance according to claim 15, wherein:
    said fluorinated resin comprises at least one of polyvinylidene fluoride (PVdF) and copolymer of polyvinylidene fluoride (PVdF) and hexafluoropropylene (HFP).

17. A corrosive resistant metal material covered with a conductive substance according to claim 16, wherein:

hexafluoropropylene (HFP) content in said copolymer of polyvinylidene fluoride (PVdF) and hexafluoropropylene (HFP) is from 0.1 to 30 volume %.

18. A corrosive resistant metal material covered with a conductive substance according to claim 1, wherein:

a thickness of said conductive oxidation-preventing layer is from 3 µm to 100 µm.

19. A corrosive resistant metal material covered with a conductive substance, comprising:

a metal layer comprising a core metal layer comprising a conductive metal selected from the group consisting of iron, aluminum, copper, titanium, magnesium, zirconium, tantalum, niobium, tungsten, nickel, chrome, an iron alloy, an aluminum alloy, a copper alloy, a titanium alloy, a magnesium alloy, a zirconium alloy, a tantalum alloy, a niobium alloy, a tungsten alloy, a nickel alloy, and a chrome alloy, and a corrosive resistant metal layer formed on said core metal layer, the corrosive resistant metal layer comprising a corrosive resistant metal, wherein the corrosive resistant metal is selected from the group consisting of titanium, zirconium, tantalum, niobium, a titanium alloy, a zirconium alloy, a tantalum alloy, and a niobium alloy; and a conductive oxidation-preventing layer formed on a surface of said corrosive resistant metal layer and comprising a mixture of conductive substance and resinous binder.

20. A corrosive resistant metal material covered with a conductive substance according to claim 19, wherein:

said conductive substance is graphite or a mixture of graphite and carbon black.

21. A corrosive resistant metal material covered with a conductive substance according to claim 20, wherein:

said conductive oxidation-preventing layer is densified to make a conductive network between graphite particles.

22. A corrosive resistant metal material covered with a conductive substance according to claim 21, wherein:

said conductive oxidation-preventing layer is densified by rolling, pressing, forging or drawing.

23. A corrosive resistant metal material covered with a conductive substance according to claim 19, wherein:

said resinous binder comprises at least one of fluorinated resin, silicone resin, phenolic resin, epoxy resin, polyimide resin, polyamide resin, polyolefin resin, furan resin and rubber.

24. A corrosive resistant metal material covered with a conductive substance according to claim 23, wherein:

said fluorinated resin comprises a copolymer of polyvinylidene fluoride (PVdF) and hexafluoropropylene (HFP).

* * * * *